April 15, 1947.　　　A. H. BENSON　　　2,418,808
PORTABLE FIRE HYDRANT
Filed March 20, 1945
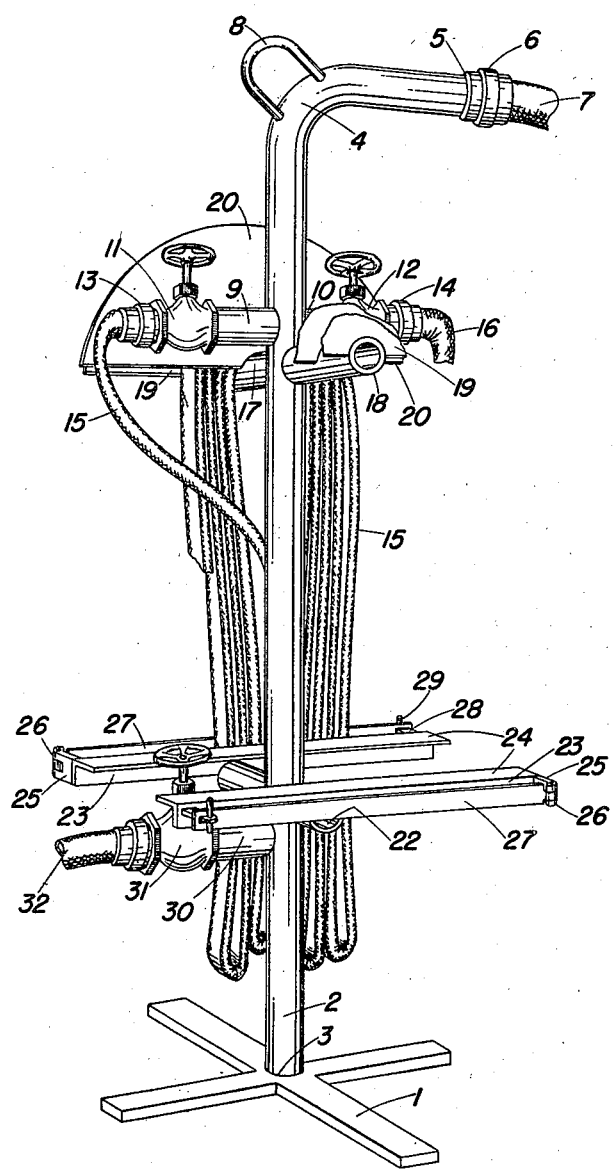
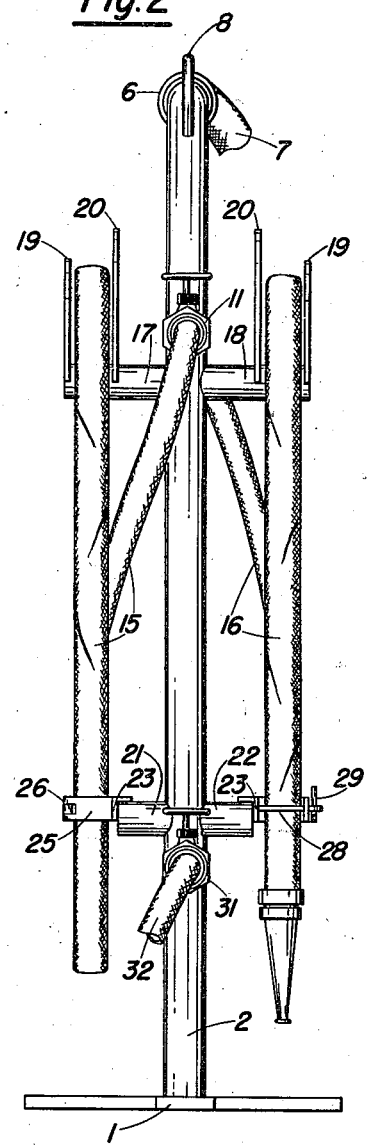
INVENTOR.
August H. Benson
BY
*M. C. Hayes*
ATTORNEY

Patented Apr. 15, 1947

2,418,808

UNITED STATES PATENT OFFICE

2,418,808

PORTABLE FIRE HYDRANT

August H. Benson, Los Angeles, Calif.

Application March 20, 1945, Serial No. 583,831

2 Claims. (Cl. 299—77)

(Granted under the act of March 3, 1883, as amended April 30, 1928; 370 O. G. 757)

This invention relates to a portable hose rack particularly adapted to use as a fire hydrant. The device of the invention is especially useful as a fire hydrant on board ships on which the ship's own water system is inoperative, as for example when the ship is undergoing repairs of such nature that her own system is out of use or in new construction before the ship's system is in operation.

The principal objects of the invention are to provide a portable fire hydrant that can be readily seen and that is instantly available for use; to provide an auxiliary water system that can be operated by unskilled persons and which will occupy a minimum of space; to reduce the man hours heretofore involved in servicing a ship with water; to protect hoses employed with the hydrant and prolong the life thereof; to facilitate inspection of fire fighting equipment; and to provide improved elements and arrangements thereof in a hydrant of the character noted.

In accomplishing these and other objects of the present invention, I have provided improved details of structure, the preferred form of which is illustrated in the accompanying drawing wherein:

Fig. 1 is a perspective view of a portable hose rack embodying the features of the present invention, upper hose confining brackets on one side thereof being shown in fragmentary form and the customary lengths of hose employed therewith also being omitted for purposes of clarity.

Fig. 2 is an elevational view taken from the left side in Fig. 1.

Referring more in detail to the drawing:

The hose rack is supported on a base 1 that may be of any suitable structure heavy enough to support the rack and normally prevent unintended tilting.

Extending upwardly from the base is a pipe 2 secured at its lower end to the base 1, the base closing the lower end 3 of the pipe 2. The upper end of the pipe is turned as at 4 and terminates in an inlet 5 adapted to be provided with a hose fitting 6, in such a manner that water may be admitted to the pipe 2 through a hose 7 that leads to a source of supply. In this connection it will be apparent that the hose 7 is supported in a sufficiently elevated position to keep it clear of the deck of a ship or other supporting surface. This manner of support obviates the possibility of workmen tripping on the hose.

A handle 8 is preferably provided at the turn or bend in the pipe to facilitate handling of the rack and suitable placement thereof by a crane.

Outlet nipples 9 and 10 are provided in the pipe 2. The outlet nipples include valves 11 and 12 to control flow of water through the respective outlets to hose connections 13 and 14 for the hose lengths indicated at 15 and 16.

In order to support and confine the lengths of hose when they are not being used and to make them readily available for use when necessary, laterally projecting arms 17 and 18 are mounted on the pipe 2 near the upper end thereof, as by welding. Spaced guide plates 19 and 20 are mounted on each of the arms 17 and 18 to form guides for the hose lengths to prevent their slipping off the arms. The lengths of hose are looped over the arms between the guide plates.

For additionally confining the lengths of hose, laterally arranged arms 21 and 22 are suitably mounted on pipe 2 in spaced relation to arms 17 and 18 and preferably in parallel relation thereto. The arms 21 and 22 provide supports for brackets that preferably comprise angle irons, the downwardly directed flanges 23 of which are secured against the ends of the arms 21 and 22 and the inwardly directed flanges 24 of which overlap and lie upon the upper surfaces of the arms 21 and 22. End plates 25 are secured at one end to an end of the angle irons and are provided at their outer ends with hinges 26, to which latch arms 27 are pivoted. The ends of the latch arms 27 opposite the hinges are preferably provided with openings that are registrable with fingers 28, that pass through the arm openings and have holes in their ends for receiving the lock pins 29. The fingers 28 may be suitably secured to the angle irons to thus form an enclosure within which one length of hose may be confined. When the hose rack is used as a fire hydrant, it is desirable to keep the hoses 15 and 16 in place on the rack at all times when not actually needed to fight fire in order that they may be instantly available in case a fire should break out. To enable workmen to utilize the hydrant as a source of water for purposes other than fire fighting and yet not disturb these hoses, I provide an additional water outlet 30 in the pipe. The outlet 30 is equipped with a valve 31 and connection adapted to receive hose 32.

Operation

Assuming the hose length 7 to be connected to a source of supply and the valves 11, 12 and 31 closed, the pipe 2 forms a reservoir from which water under pressure may be discharged through any or all of the hose lengths 15, 16 and 32 as desired upon opening of the respective valves. When the device has served its immediate purpose, the latch arms 27 of the lower hose confining brackets are swung outwardly away from the rack and the hose 15 may be looped over the arm 17 or 18 between the guide plates 19 and 20 between the arms 23 and 27 of the lower bracket below the arms 17 or 18. In like manner the hose 16 may be looped over the other arm 17 or 18 between the upstanding guide plates thereon and the lower ends of the loops may be positioned within the angle iron brackets therebelow. The arms 27 are then swung back toward the fingers 28 and the locking pins 29 applied to the fingers 28 to lock the hose lengths in confined condition.

The source of supply being shut off and the hose 32 being disconnected, the rack as a whole, with hose lengths supported thereby, may be moved by a crane or other suitable manner to another place where it be desired to provide readily available fire fighting equipment.

It is apparent therefore that I have provided a portable hose rack which is ideally suited to use as a fire hydrant and which is available for furnishing water for other purposes without disturbing the fire hose outlets. I have described a single embodiment of my invention, but it should be apparent that the structure is susceptible to numerous modifications without departing from the spirit of the invention. Therefore I do not wish to be limited by the disclosure, but only by the scope of the appended claims.

This invention described herein may be manufactured and used by or for the Government of the United States of America for governmental purposes without the payment of any royalties thereon or therefor.

I claim:

1. A portable fire hydrant comprising a base, a pipe rigidly secured to said base extending substantially perpendicular from the plane of the base, said pipe being closed at the end adjacent the base and having a bent over portion at the opposite end, a coupling at the end of said bent over portion adapted to receive a hose from a source of fluid supply, a pair of pipes extending from the first named pipe substantially perpendicular thereto, each of said second named pipes having a valve and a connection adapted to receive a hose, a pair of supporting arms secured to said first named pipe substantially perpendicular thereto and to said second named pipes, a pair of substantially parallel guide plates secured adjacent the outer end of each of said arms in spaced relation to each other to form a hose guide, a second pair of arms secured to said first named pipe substantially perpendicular thereto between said first named arms and said base, said second named arms having latch means to cooperate with said first named arms to secure a hose to the hydrant.

2. A portable fire hydrant comprising a base, a pipe secured to said base adapted to be connected to a source of fluid at the end opposite said base, a pair of arms secured to said pipe, guide means on said arms for retaining coiled hoses, lock means carried by said pipe between said arms and said base for securing hoses retained by said guide means, and means for operatively connecting the hoses to said pipe.

AUGUST H. BENSON.

REFERENCES CITED

The following references are of record in the file of this patent:

UNITED STATES PATENTS

| Number | Name | Date |
|---|---|---|
| 1,023,218 | Mueller et al. | Apr. 16, 1912 |
| 1,114,079 | Webster | Oct. 20, 1914 |
| 1,758,131 | Stirdvant | May 13, 1930 |